US 12,554,150 B2
United States Patent
Gutierrez et al.

(10) Patent No.: US 12,554,150 B2
(45) Date of Patent: Feb. 17, 2026

(54) CREATING AN INTERFACE BETWEEN A CONTROL SYSTEM AND AN ELECTRONIC EYEMOUNTED OCULAR DEVICE ON PRE-EXISTING EYEGLASSES

(71) Applicant: Verily Life Sciences LLC, Dallas, TX (US)

(72) Inventors: Christian Gutierrez, South San Francisco, CA (US); Dimitri Azar, South San Francisco, CA (US)

(73) Assignee: Verily Life Sciences LLC, Dallas, TX (US)

( * ) Notice: Subject to any disclaimer, the term of this patent is extended or adjusted under 35 U.S.C. 154(b) by 428 days.

(21) Appl. No.: 18/113,321

(22) Filed: Feb. 23, 2023

(65) Prior Publication Data

US 2023/0273463 A1    Aug. 31, 2023

Related U.S. Application Data

(60) Provisional application No. 63/313,950, filed on Feb. 25, 2022.

(51) Int. Cl.
G02C 11/00    (2006.01)
G02C 7/04    (2006.01)

(52) U.S. Cl.
CPC ............ *G02C 11/10* (2013.01); *G02C 7/04* (2013.01)

(58) Field of Classification Search
CPC ... G02C 11/10; G02C 7/04; A61F 2/16; A61F 2250/0002; A61B 5/6821
USPC ........................................................ 351/158
See application file for complete search history.

(56) References Cited

U.S. PATENT DOCUMENTS

| 5,737,056 | A | * | 4/1998 | Martin | G02C 7/02 351/159.75 |
| 5,867,247 | A | * | 2/1999 | Martin | G02C 7/021 351/159.81 |
| 5,953,096 | A | | 9/1999 | Friedman | |
| 6,027,214 | A | * | 2/2000 | Graham | G02C 7/086 351/41 |

(Continued)

FOREIGN PATENT DOCUMENTS

EP    2412305 A1    2/2012
WO    2011/130374 A1    10/2011

(Continued)

OTHER PUBLICATIONS

International Search Report and Written Opinion received for PCT Patent Application No. PCT/US23/13687, mailed on Jun. 20, 2023, 10 pages.

(Continued)

*Primary Examiner* — William R Alexander
(74) *Attorney, Agent, or Firm* — Haynes and Boone, LLP

(57) ABSTRACT

A modular system can be used with commercial eyeglasses to interface with an electronic eye-mounted ocular device and used to control and/or actuate the electronic eye-mounted ocular device, exchange data with the electronic eye-mounted ocular device, and/or charge the electronic eye-mounted ocular device. The modular system includes an electroactive stick-on component attachable to a portion of an eyeglasses lens; and an electronic system attachable to an eyeglass frame in electrical communication with the electroactive stick-on component.

20 Claims, 6 Drawing Sheets

(56) References Cited

U.S. PATENT DOCUMENTS

| | | | |
|---|---|---|---|
| 6,170,952 B1* | 1/2001 | La Haye | C08G 18/758 351/159.41 |
| 6,655,799 B1 | 12/2003 | Chen | |
| 7,219,991 B2 | 5/2007 | Weston | |
| 7,874,666 B2 | 1/2011 | Xu et al. | |
| 7,926,940 B2 | 4/2011 | Blum et al. | |
| 8,113,651 B2 | 2/2012 | Blum et al. | |
| 8,702,231 B1* | 4/2014 | Blackham | G02C 9/00 351/47 |
| 9,229,246 B2 | 1/2016 | Yi et al. | |
| 9,389,437 B1 | 7/2016 | Tammaro | |
| 9,482,882 B1 | 11/2016 | Hanover et al. | |
| 9,895,467 B2 | 2/2018 | Grubbs et al. | |
| 10,149,958 B1 | 12/2018 | Tran et al. | |
| 10,365,502 B2 | 7/2019 | Ho | |
| 10,399,291 B2 | 9/2019 | Hahn et al. | |
| 10,451,895 B2 | 10/2019 | Macnamara et al. | |
| 10,459,128 B2 | 10/2019 | Milton et al. | |
| 10,874,297 B1 | 12/2020 | Freeman et al. | |
| 11,033,429 B2 | 6/2021 | Rubinfeld et al. | |
| 2005/0168683 A1 | 8/2005 | Darata et al. | |
| 2008/0062338 A1 | 3/2008 | Herzog et al. | |
| 2008/0062378 A1 | 3/2008 | McCracken | |
| 2011/0181828 A1 | 7/2011 | Yi et al. | |
| 2013/0225968 A1 | 8/2013 | Auvray et al. | |
| 2016/0026004 A1 | 1/2016 | Sheldon et al. | |
| 2016/0252748 A1 | 9/2016 | Jiang | |
| 2017/0146824 A1* | 5/2017 | Martinez | G02C 7/06 |
| 2018/0090958 A1* | 3/2018 | Steger | A45C 11/04 |
| 2018/0157065 A1* | 6/2018 | Curley | G02C 9/00 |
| 2018/0249151 A1 | 8/2018 | Freeman et al. | |
| 2020/0142203 A1 | 5/2020 | Moore et al. | |
| 2021/0011204 A1 | 1/2021 | Mastrangelo et al. | |
| 2022/0171218 A1 | 6/2022 | Sakuma et al. | |
| 2022/0324188 A1* | 10/2022 | Van Heugten | B33Y 80/00 |
| 2023/0273461 A1* | 8/2023 | Gutierrez | G02C 9/04 351/158 |
| 2024/0151989 A1* | 5/2024 | Zhou | A45C 11/04 |

FOREIGN PATENT DOCUMENTS

| | | |
|---|---|---|
| WO | 2013/006153 A1 | 1/2013 |
| WO | 2014/130602 A1 | 8/2014 |
| WO | 2015/157855 A1 | 10/2015 |
| WO | 2016/054860 A1 | 4/2016 |

OTHER PUBLICATIONS

Jamali, A., et al., "Large area liquid crystal lenses for correction of presbyopia", Optics Express, vol. 28, No. 23, 2020, pp. 33982-33993.

* cited by examiner

CREATING AN INTERFACE BETWEEN A CONTROL SYSTEM AND AN ELECTRONIC EYEMOUNTED OCULAR DEVICE ON PRE-EXISTING EYEGLASSES

CROSS-REFERENCE TO RELATED APPLICATIONS

This application claims the benefit of U.S. Provisional Application Ser. No. 63/313,950, filed 25 Feb. 2022, entitled "SYSTEM FOR CONTROL OF ELECTRONIC EYE-MOUNTED OCULAR DEVICES". The entirety of this application is incorporated by reference for all purposes.

TECHNICAL FIELD

The present disclosure relates generally to enabling communication between a control system and one or more electronic eye-mounted ocular device via an interface and, more specifically, to a modular system, that is attachable to a patient's preexisting eyeglasses, that can create an interface between the control system and one or more electronic eye-mounted ocular device, allowing the control system to control the electronic eye-mounted ocular device, actuate the electronic eye-mounted ocular device, exchange data with the electronic eye-mounted ocular device, and/or charge the electronic eye-mounted ocular device.

BACKGROUND

Many types of electronic eye-mounted ocular devices need to interface with external control systems (e.g., external electronics). Examples of these types of electronic eye-mounted ocular devices include, but are not limited to, an electroactive contact lens, an intraocular lens implant (IOL), and one or more eye-mounted sensors. Currently, eyeglasses or eyeglasses-like wearable devices (e.g., "smart glasses") can be produced that can include an external control system and/or the required interface. Indeed, over four billion adults in the world wear eyeglasses, making a patient's pre-existing eyeglasses an ideal platform for creating such required interfaces. However, instead of taking advantage of a patient's preexisting eyeglasses, current platforms for housing and/or interfacing (i.e., creating an interface) between an external control system and an electronic eye-mounted device use specialized eyeglasses. Such specialized eyeglasses require full costly, customization and provide users with limited options for fit, comfort, and/or style. There are currently no solutions that easily retrofit and removably attach to a user's existing commercial frames and lenses to provide necessary interfacing (i.e., creating an interface) between control systems and electronic eye-mounted ocular devices.

SUMMARY

The present disclosure provides a solution that allows users to employ existing commercial eyeglasses frames and lenses to create an interface between a control system and an electronic eye-mounted ocular device. A modular system is attachable to a patient's pre-existing eyeglasses to provide the interface.

As such, described herein is a modular system that can be mounted to existing frames and/or lenses to interface with electronic eye-mounted ocular devices. The modular system includes an electroactive stick-on component attachable to a portion of an eyeglasses' lens; and an electronic system attachable to an eyeglasses frame in electrical communication with the electroactive stick-on component. The electroactive stick-on component is configured to wirelessly couple to an electronic eye-mounted ocular device to control and/or actuate the electronic eye-mounted ocular device, exchange data with the eye-mounted device, and/or charge the electronic eye-mounted ocular device.

Also described herein is a method for employing a patient's existing commercial frames and lenses to create an interface between a control system and an electronic eye-mounted ocular device. The method employs a modular system that can be mounted to the existing frames and/or lenses to interface with electronic eye-mounted ocular devices. The electroactive stick-on component can be applied to at least one lens of eyeglasses, wherein the electroactive stick-on component is reversibly attachable to the at least one lens of the eyeglasses. An electrical connection area of the electroactive stick-on component comprising a low profile conductor can be connected to an electrical connection area comprising another low profile conductor of an electrical system attached to a frame of the eyeglasses. Communication can be established between the electrical stick-on component and an eye-mounted ocular device so that the electrical system controls the electronic eye-mounted ocular device, actuates the electronic eye-mounted ocular device, exchanges data with the electronic eye-mounted ocular device, and/or charges the electronic eye-mounted ocular device.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

I. Definitions

Figure 1:
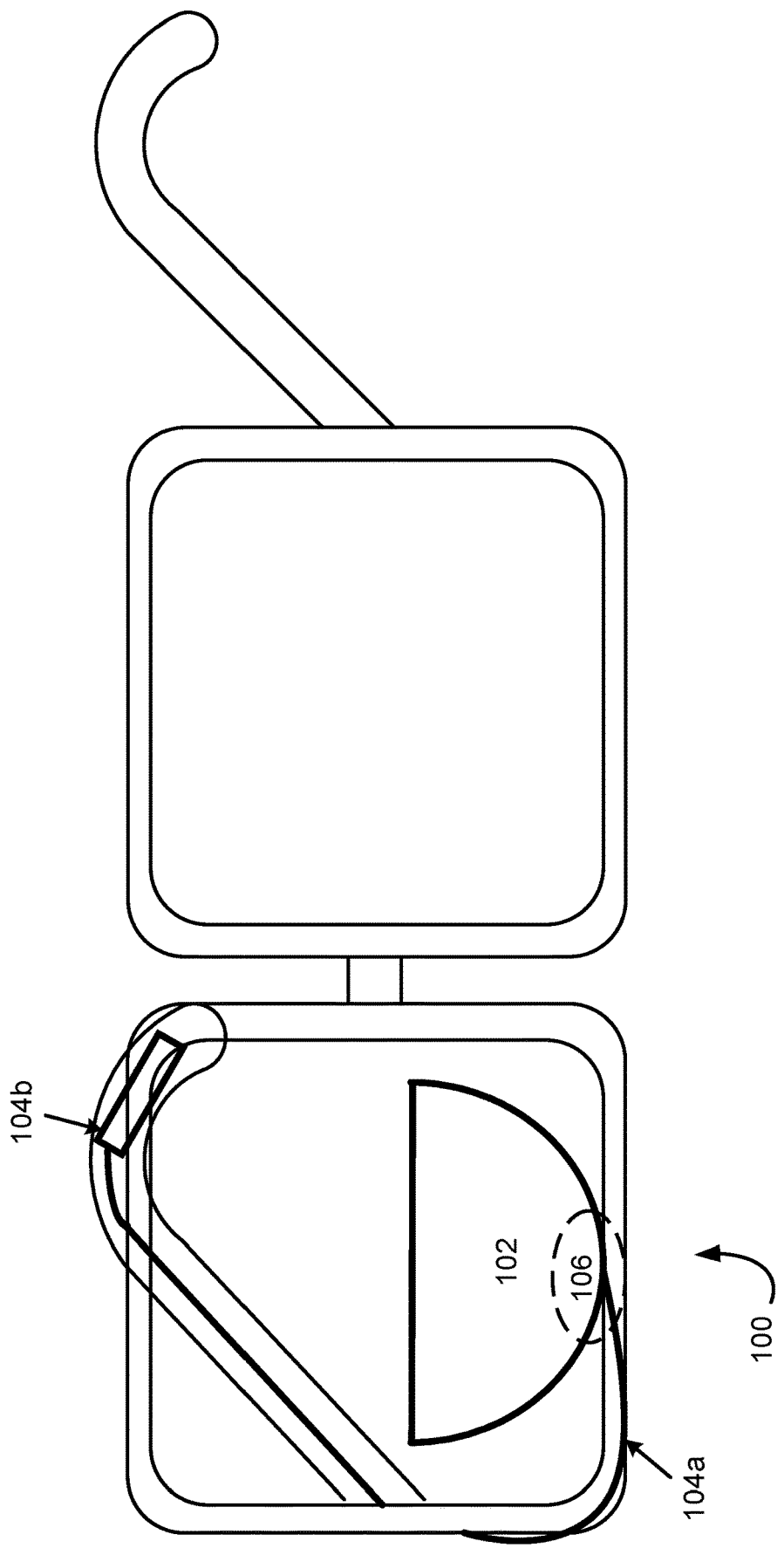
FIG. 1 illustrates a modular system that can be mounted to existing frames and/or lenses to interface with an electronic eye-mounted ocular device.

Unless otherwise defined, all technical terms used herein have the same meaning as commonly understood by one of ordinary skill in the art to which the present disclosure pertains.

As used herein, the singular forms "a," "an" and "the" can also include the plural forms, unless the context clearly indicates otherwise.

As used herein, the terms "comprises" and/or "comprising," can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

As used herein, the terms "first," "second," etc. should not limit the elements being described by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "eyeglasses" has a similar meaning to the terms "spectacle" and "glasses" and refers to one or more lenses mounted in a frame that holds the one or more lenses in front of a person's eye or eyes and has at least one arm, typically two arms, that each extend over an ear of a wearer. Eyeglasses can include at least one of glasses for correcting or treating defective eyesight (e.g., near-sightedness, far-sightedness, astigmatism, or the like), sunglasses, safety glasses, and glasses used for merely aesthetic purposes.

As used herein, the term "frame" refers to a device and/or mechanism that is designed to hold the one or more lens in a proper position on a person's head such that the one or more lens is held in front of the person's eye(s). Frames exist in a variety of styles, sizes, materials, shapes, and colors. Typically, the frame includes at least a bridge over the nose, rims around at least a portion of each of the one or more lens (typically two lenses) and holding the one or more lens to the frame, and hinged arms (or temples/temple pieces) that extend from an axial portion of the rims to temple tips that rest over the person's ears.

As used herein, the term "lens" refers to a generally clear device (but may include tinting, in some instances) held over one or more of a person's eyes by a frame. The lens can be, but is not limited to, a glass material, a plastic material, or the like that is substantially transparent to at least the visible light spectrum. The lens can be a prescription and/or corrective lens, a cosmetic lens, a sunglasses lens, a safety lens, or the like. For example, the lens can concentrate or disperse light rays.

As used herein, the term "electronic eye-mounted ocular device" refers to at least a portion of an electronic system requiring close contact with the eye or surrounding tissue. Non-limiting examples include electroactive contact lenses, intraocular lens implants (IOLs), sensors, pumps, and other treatment devices in, on, or near at least one of eye tissue, an eye lid, or tissues of the ocular socket.

As used herein, the term "modular" system refers to a collection of building blocks (e.g., sub-systems, components, or the like) that can be configured in different ways and independently grouped together.

As used herein, the terms "patient" and "user" synonymously refer to one who uses the modular system, the electronic eye-mounted ocular device, and/or the eyeglasses described herein.

II. Overview

One of the most obvious choices for creating an interface between an electronic eye-mounted ocular device and a control system is through eyeglasses or eyeglasses-like wearable devices. Currently, electronically capable eyeglasses that can interface with electronic eye-mounted ocular devices are completely custom-made, costly, and provide users with limited options for comfort, fit, and/or style. Traditional eyeglasses that provide nearly unlimited options for lens type, cost, comfort, fit, and/or style are nearly ubiquitous. However, traditional eyeglasses for vision correction, shade, safety, and/or aesthetic purposes are currently unable to be interfaced with electronic eye-mounted ocular devices.

Described herein is a modular system that can be mounted to existing eyeglasses (frames and lenses) allowing the existing eyeglasses to transform into electronically capable eyeglasses, providing a way to create an interface between a control system and one or more electronic eye-mounted ocular devices. The modular system includes an electroactive stick-on component attachable to a portion of an eyeglass lens; and an electronic system attachable to an eyeglass frame in electrical communication with the electroactive stick-on component. The electroactive stick-on component is configured to wirelessly couple to an electronic eye-mounted ocular device to control and/or actuate the electronic eye-mounted ocular device, exchange data with the eye-mounted device, and/or charge the electronic eye-mounted ocular device.

III. Systems

An aspect of the present disclosure can include a modular system 100 (shown in FIG. 1) that can be mounted to components of existing glasses (e.g., frame and lens) to create an interface between a control system (having at least one piece of circuitry, such as a microprocessor or non-transitory memory and processor, that performs processor tasks) and an electronic eye-mounted ocular device. The system 100 can be modular and include a collection of building blocks (e.g., sub-systems, components, or the like) that can be configured in different ways and independently grouped together. The modules can include at least electroactive stick-on component 102 and an electronic system including wire 104a and electronic system component 104b. The modules can make a connection with one another so as to establish electrical communication therebetween (an example attachment area 106 is shown in FIG. 1, but this connection 106 is meant to be illustrative and not limiting). Notably, one or more of the modules (e.g., the electroactive stick-on component 102 and/or at least a portion of the wire 104a and/or electronic system 104b) can be placed on and/or removed from the existing glasses without damaging (or substantially damaging, such that a cleaning product may be required to remove remnants) the existing glasses.

As shown in FIG. 1, the modules can include an electroactive stick-on component 102, which can be reversibly affixed to a lens of the existing glasses (e.g., can be stuck to and removed from the eyeglasses one or more times). Generally, the electroactive stick-on component 102 may not substantially block or impede a user's vision. In some instances, the electroactive stick-on component can be adhered to the lens in the user's normal field of view and can be completely see-through/transparent. In other instances, the electroactive stick-on component 102 can be at least partially see-through/transparent. Accordingly, the electroactive stick on component 102 can be substantially constructed of one or more transparent plastics (e.g., acrylic, silicone, cyclo-olefin copolymer/polymer (COC/COP), Polymethylmethacrylate (PMMA), or the like). As an example, 90% or more of the visual field can be unobstructed. As another example, 93% or more of the visual field can be unobstructed. As a further example, 95% or more of the visual field can be unobstructed. As another example, the electroactive stick-on component 102 can be adhered to the lens in an area outside the field of view when the user is looking straight ahead. However, as still another example, the electroactive stick-on component 102 can be positioned within the patient's field of view to cause an effect.

The electroactive stick-on component 102 can be stuck to a lens like a sticker with an adhesive material (e.g., a sticky material) or statically adhered to the lens. Optionally, the electroactive stick-on component 102 may be additionally, or alternatively, mechanically clipped onto the frame above, besides, or below the lens and/or the lens itself (e.g., with a spring-loaded clip or magnet assembly). In some instances, the adhesive material can be substantially see-through and may leave minimal residue on the glasses upon removal of the electroactive stick-on component, including one or more optical-grade pressure sensitive adhesives. In other instances, when the adhesive material and/or residue from the adhesive material is left on a lens after removal of an electroactive stick-on component 102, then the adhesive material and/or residue may be removable (e.g., by cleaning with a special chemical and/or warm water and soap).

The electroactive stick-on component 102 can be removably adhered to either side of a given lens (e.g., the front side facing the world or the back side facing the user) and can be of various sizes and/or shapes depending on the application (e.g., ocular condition being corrected and/or treated for) and/or the shape of the underlying lenses. As illustrated in FIG. 1, the electroactive stick-on component 102 has a half-moon shape, but this is only for ease of illustration and explanation, the electroactive stick-on component can be any shape. The electroactive stick-on component 102 can have any shape that fits within the lens. Additionally, the electroactive stick-on component 102 can be any size/shape required for a given application.

It should be noted that in some instances, it may be preferred that the electroactive stick-on component 102 be sized and dimensioned to take up all or substantially all of the lens. Additionally, although the electroactive stick-on component 102 is illustrated as adhered to a certain lens, this is just for illustration purposes; the electroactive stick-on component 102 can adhere to either lens of the eyeglasses or an electroactive stick-on component can be individually adhered to both lenses. Separate electroactive stick-on components 102 are necessary if their functionality is required on both lenses of the eyeglasses. Multiple electroactive stick-on components 102 can be adhered to different portions of a lens. When multiple electroactive stick-on components 102 are used each can have the same or different functions.

The modules can also include an electronic system (with a wire 104a and a components portion 104b) that can be removably attached to at least a portion of the frame of the eyeglasses and the electroactive stick on component 102. However, the two components of the electronic system (wire 104a and components portion 104b) are only drawn as positioned for ease of illustration. It should be appreciated that the electronic system (wire 104a and components portion 104b) can have any number of modular components positioned in any place on the frame of the eyeglasses.

The electronic system (wire 104a and components portion 104b) can also include control electronics and a power source. As an example, the electronic system (wire 104a and components portion 104b) can be embodied (at least in part) within a temple-tip attachment that can include one or more of a flexible substrate, an adhesive, extra power storage, additional control electronics, and additional interfaces with the electroactive stick-on component 102. In another example, the electronic system (wire 104a and components portion 104b) can be at least in part attached to the part of the frames surrounding at least one of the lenses. The attachment mechanism can be at least one of adhesive, magnetic, clip on, clip over, or the like). The electronic system (wire 104a and components portion 104b) can communicate with the electroactive stick-on component 102 to provide most of the electrical functionality to the electroactive stick-on component 102 (which can act as an end-effector). In other words, the electronic system (particularly the component portion 104b) can act as the "brains" of the electroactive stick-on component 102 by including additional control electronics that are used by the electroactive stick-on component. It should be noted that the electronic system (wire 104a and components portion 104b) need not be see through and may include conductive materials standard for a flex printed circuit board (PCB) (such as polyimide, Polyethylene terephthalate (PET), nylon, Liquid Crystal Polymer (LCP), or the like). The electronic system can include a components portion (shown here as 104b and described in more detail below), which can be positioned on one or more portions of the frame (e.g., a temple tip, a portion or all of the arm, the nose bridge, or the like) and a wire shown here as 104a) for creating an interface between a control system and the electroactive stick-on component 102 to facilitate communication between the components portion 104b and the electroactive stick-on component 102.

The wire 104a (e.g., made of a substantially flat, flexible mini-cable, attachable to the frame by one or more wire harness attachments) of the electronics system can interface with the electroactive stick-on component 102 through respective electrical connection areas in an attachment area 106. It should be noted that the attachment area 106 can be located at any position where the wire 104a may interface with the electroactive stick-on component 102. In some instances, the attachment area 106 interface between the wire 104a and the electroactive stick-on component 102 can be at least partially along a boundary between the lens and the frame. Each of the wire 104a and the electroactive stick-on component 102 can be equipped with a connection mechanism, such as low-profile connector 200 shown in FIG. 2, where the two connection mechanisms fit together (e.g., universal connection, male-female connection, etc.). The connection mechanisms can create a connection with one another so that the electroactive stick-on component 102 and the electronic system (wire 104a and components portion 104b) can electrically communicate therebetween. For example, the connection can occur within the attachment area 106 of FIG. 1.

Figure 2:
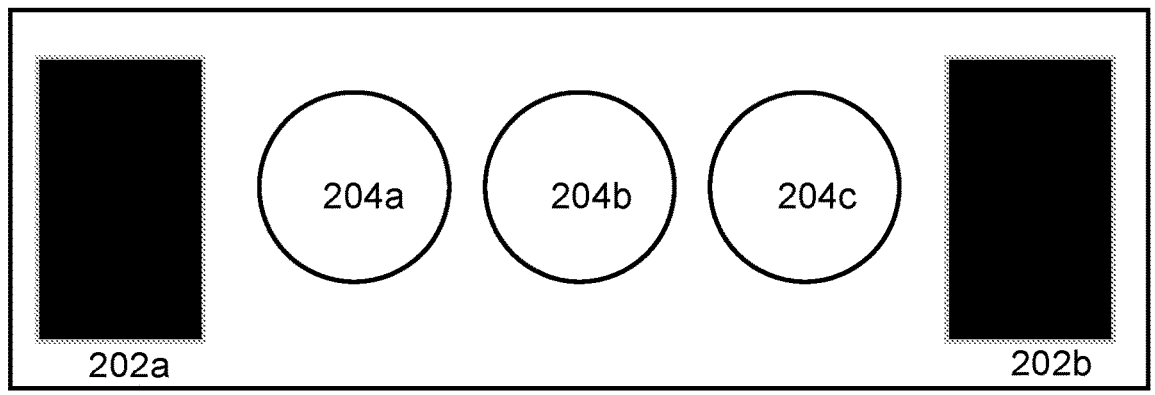
FIG. 2 illustrates an example connection mechanism that can be employed between components of the modular system of FIG. 1.

As shown in FIG. 2, the low-profile connector 200 can include one or more magnets/magnetic elements (two magnetic elements 202a, 202b shown in FIG. 2) that can facilitate attachment of the electroactive stick-on component 102 and/or the electronic system (wire 104a and components portion 104b) and/or the frames at attachment area 106. The low-profile connector 200 can also include one or more electrical interconnects (three electrical interconnects 204a, 204b, and 204c are shown) to establish data transfer between the electroactive stick-on component 102 and the electronic system (wire 104a and components portion 104b). In some instances, however, this communication can be established wirelessly or at least partially wirelessly (e.g., via RF communication and/or Bluetooth, or the like). The low-profile connector 200 can also include a flexible substrate that holds at least some of the one or more magnets/magnetic elements 202a, 202b and the one or more electrical interconnects 204a-c.

Figure 3:
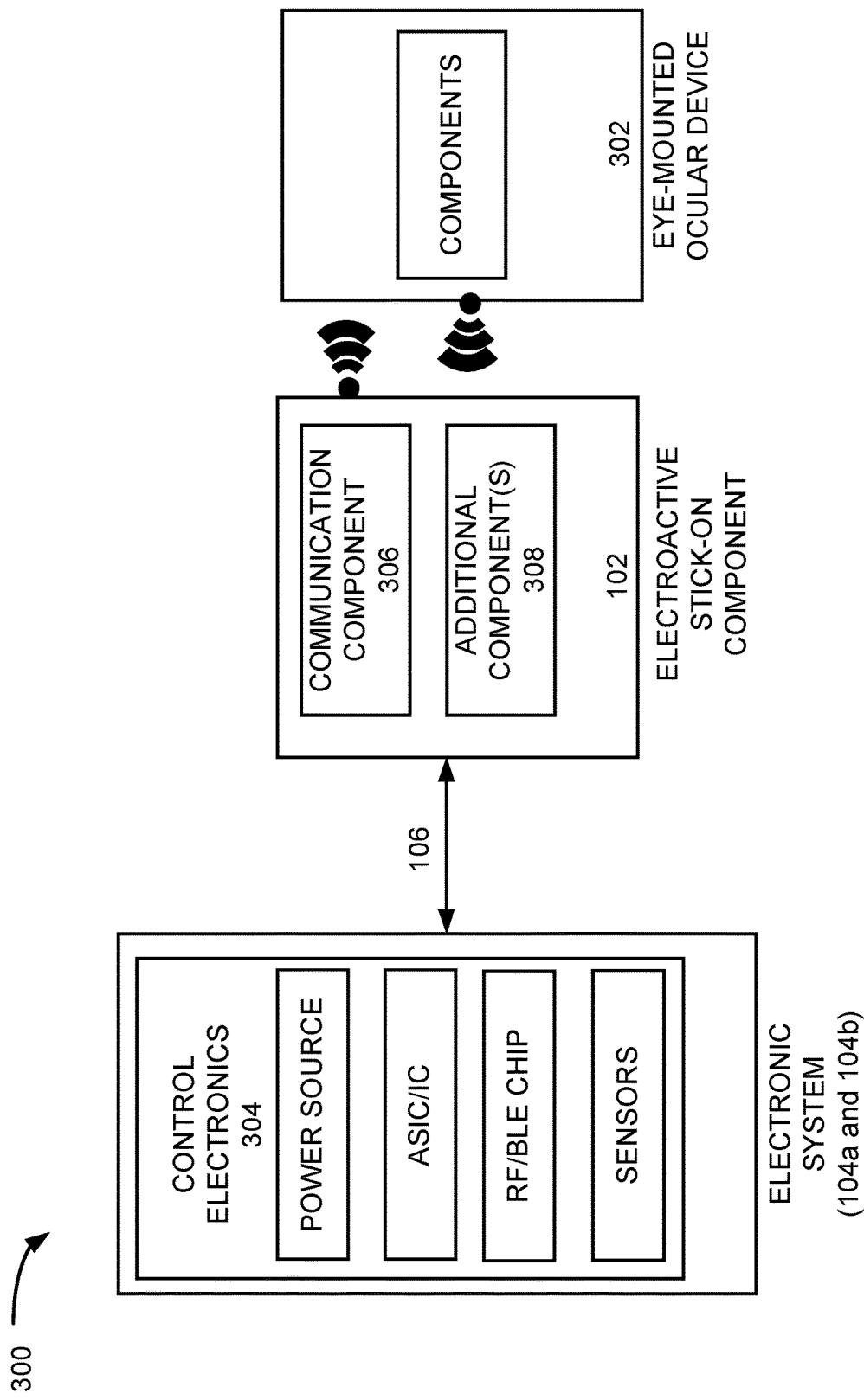
FIGS. 3-5 illustrate an example of components of the modular system of FIG. 1.

An example of the modular system 100 is shown in greater detail as system 300 in box diagram form in FIG. 3.

The electroactive stick-on component 102 is attached (e.g., by a wired connection at the communication area 106) to at least a portion of the electronic system (e.g., wire 104a) that is attached to another at least a portion of the electronic system (e.g., components portion 104b). It should be noted that although illustrated as a wired connection, the attachment could alternatively be a wireless connection or a connection that is both wired and wireless. As an example, the attachment area 106 can include the low profile connector 200 of FIG. 2.

The electronic system (wire 104a and components portion 104b) can include control electronics 304 for the electroactive stick-on component 102, and/or at least a portion of the electronic eye-mounted ocular device 302, that can be in communication with the electroactive stick-on component to control at least a portion of the electroactive stick-on component and/or at least a portion of the electronic eye-mounted ocular device to control at least a portion of the electronic eye-mounted ocular device. The control electronics 304 can be embodied in the wire 104a and/or the components portion 104b. However, in some instances, a majority of the control electronics 304 can be embedded in the components portion 104b. In other instances, the control electronics 304 can be entirely embedded in the components portion 104b (but the wire 104a may include outreaching parts of elements of the component portion, such as sensors).

The control electronics 304 can include, for example, a power source, a control chip (e.g., an ASIC or IC as illustrated), a communication chip (e.g., a radio frequency (RF) and/or Bluetooth low energy (BLE) chip as illustrated), one or more sensors, and the like. The electroactive stick-on component 102 can include an optional communication component 306 and also can include additional component(s) 308 based on the ocular condition to be treated (or the additional task to be completed). The optional communications component 306 can include a loop antenna or a Bluetooth low energy (BLE) device for bidirectional communication with the at least a portion of the control electronics 304 and/or the electronic eye-mounted ocular device 302 (that can include similar communication components to finish the communication loop). As an example, the loop antenna or BLE device can be located at the edge or periphery of the electroactive stick-on component 102 and need not be very thick (e.g., no more than a few hundred microns in width) in order to make most of the electroactive stick-on component 102 substantially unobstructed and transparent (as described above, at least 90%, 93%, or 95%). The additional component(s) 308 can include, but are not limited to, one or more illumination devices, such as LEDs, one or more camera, one or more photodetector, or one or more other sensors (e.g., acoustic/ultrasound, near-field/radar, EEG/EOG, or the like), which may be controlled by the electronic system (wire 104a and components portion 104b).

The electroactive stick-on component 102 can communicates wirelessly with an electronic eye-mounted ocular device 302. In short, the electroactive stick-on component 102 can wirelessly couple to an electronic eye-mounted ocular device to control and/or actuate the electronic eye-mounted ocular device 302, exchange data with the electronic eye-mounted ocular device 302, and/or charge the electronic eye-mounted ocular device 302 (functionality given by the electronic system). The electronic eye-mounted ocular device 302 can have one or more components in need of control and/or actuation, data exchange, and/or charging.

The electronic system (wire 104a and components portion 104b) can include control electronics 304 for the electroactive stick-on component 102 to communicate with the eye-mounted ocular device. The control electronics 304 can include, for example, a power source, a control chip (e.g., an ASIC or IC), a communication chip (e.g., an RF or BLE chip), one or more sensors, and the like. The electroactive stick-on component 102 can include a communication component 306 and may include additional component(s) 308. The communications component 306 can include a loop antenna, an optical communication device (e.g., an LED), or a BLE device for bidirectional communication with the eye-mounted ocular device 302. As an example, the loop antenna or Bluetooth low energy (BLE) device can be located at the very edge or periphery of the electroactive stick-on component 102 and need not be very thick (e.g., no more than a few hundred microns in width) in order to make most of the electroactive stick-on component 102 unobstructed and see through (as described above, at least 90%, 93%, or 95%). The optional additional component(s) 308 can include one or more illumination devices, such as LEDs, one or more camera, or one or more sensors, which may be controlled by the electronic system.

The electronic system (wire 104a and components portion 104b) and the electroactive stick-on component 102 can be in communication with one or more types of eye-mounted ocular device 302 for a variety of uses. For example, if the eye-mounted ocular device 302 is an underlid device (such as for drug delivery or dry eye stimulation or the like) the electroactive component 102 and/or the electronic system (wire 104a and components portion 104b) can interface with the underlid device for at least one of charging, programming, data download/upload, and control. For example, if the eye-mounted ocular device 302 is an electroactive/smart contact lens (such as for drug delivery, electrotherapy, optical monitoring, physiological monitoring, or the like) the electroactive component 102 and/or the electronic system (wire 104a and components portion 104b) can interface with the electroactive/smart contact lens for at least one of charging, programming, data download/upload, control, and therapeutic delivery (e.g., control and/or stimulation driven externally for transcorneal stimulation or drug release). For example, if the eye-mounted ocular device 302 is a smart intraocular lens (IOL) (such as for drug delivery or optical correction or the like) the electroactive component 102 and/or the electronic system (wire 104a and components portion 104b) can interface with the smart IOL for at least one of charging, programming, data download/upload, and control. For example, if the eye-mounted ocular device 302 is an intraocular pressure sensor (IOP) sensor, then electroactive component 102 and/or the electronic system (wire 104a and components portion 104b) can interface with the IOP sensor for at least one of charging, calibration, and data download/upload. For example, if the eye-mounted ocular device 302 is an implanted pump (such as for IOP pressure regulation) the electroactive component 102 and/or the electronic system (wire 104a and components portion 104b) can interface with the implanted pump for at least one of charging, programming, data download/upload, and control. For example, the eye-mounted ocular device can communicate to the electroactive stick on component 102 (e.g., when the eye-mounted device detects an IOP, glucose, or the like) by causing a change in the electroactive stick on component 102.

The electroactive stick-on component 102 can placed on the lens of the glasses such that it can establish communication with one or more of the components of the eye-mounted ocular device, The modular system 100 can have some leeway in terms of positional tolerance for the electroactive stick-on component 102. The electroactive stick-on component 102 can be positioned in the right place by ensuring good design of the communication component 306 to enable communication wherever it is placed on the lens. In some instances, the optional additional component(s) 308 can include a light source, like an LED, to inform the person using the system 100 when the electroactive stick-on component 102 is aligned to adequately communicate with the electronic eye-mounted ocular device 302.

Figure 4:
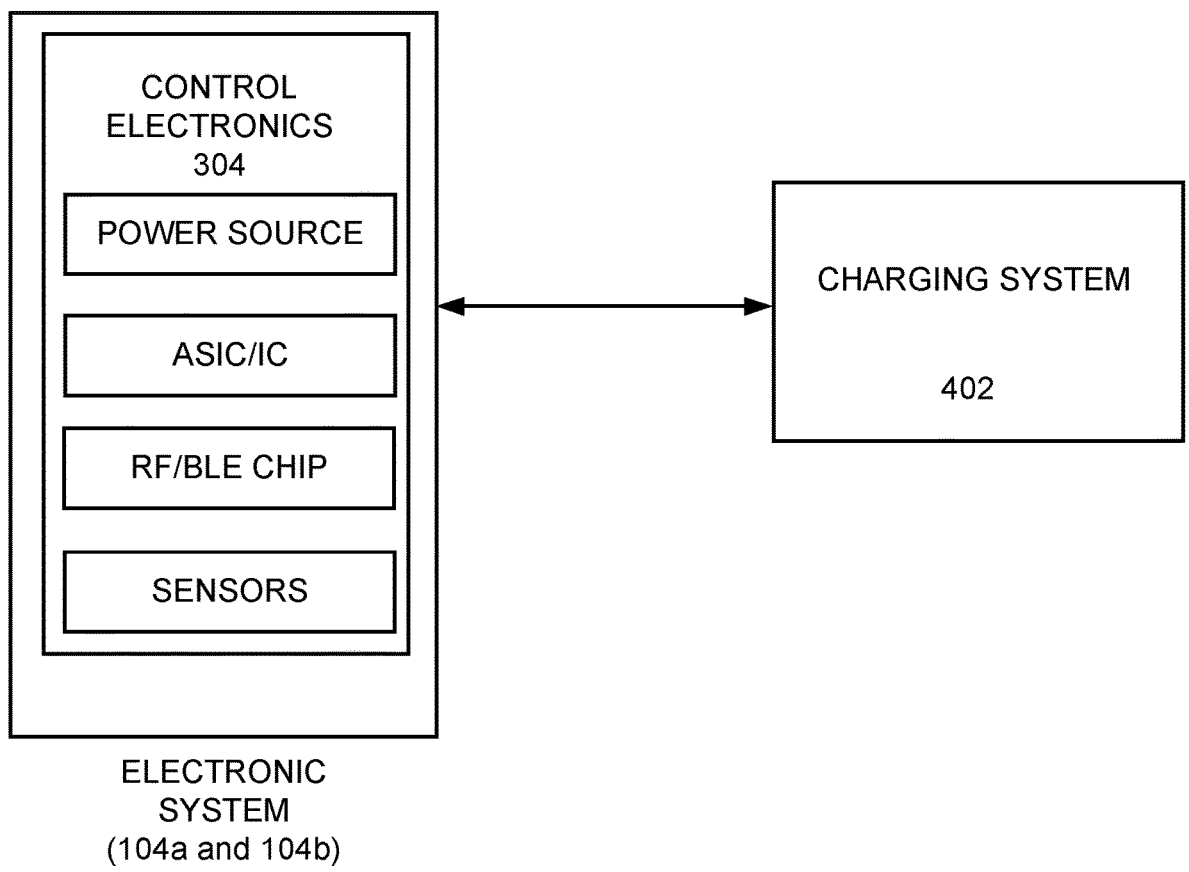
Figure 5:
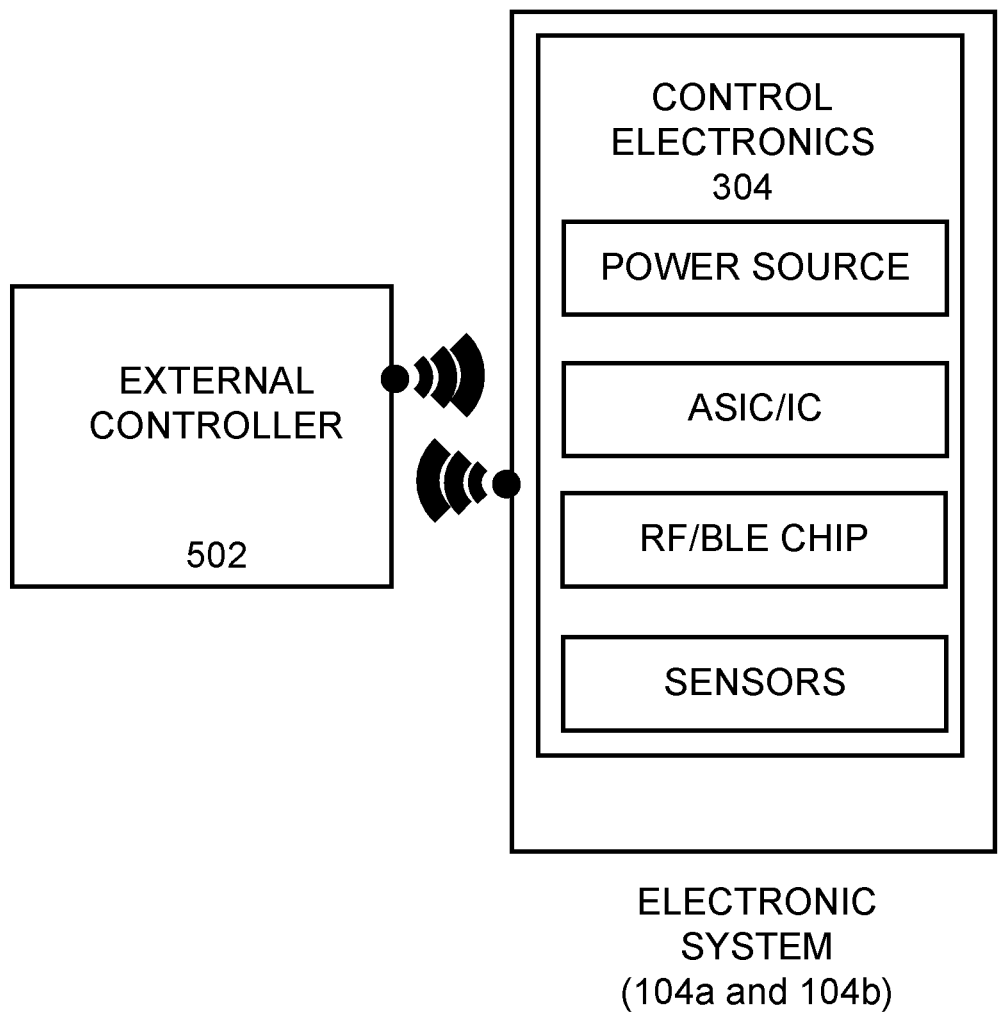
Figure 6:
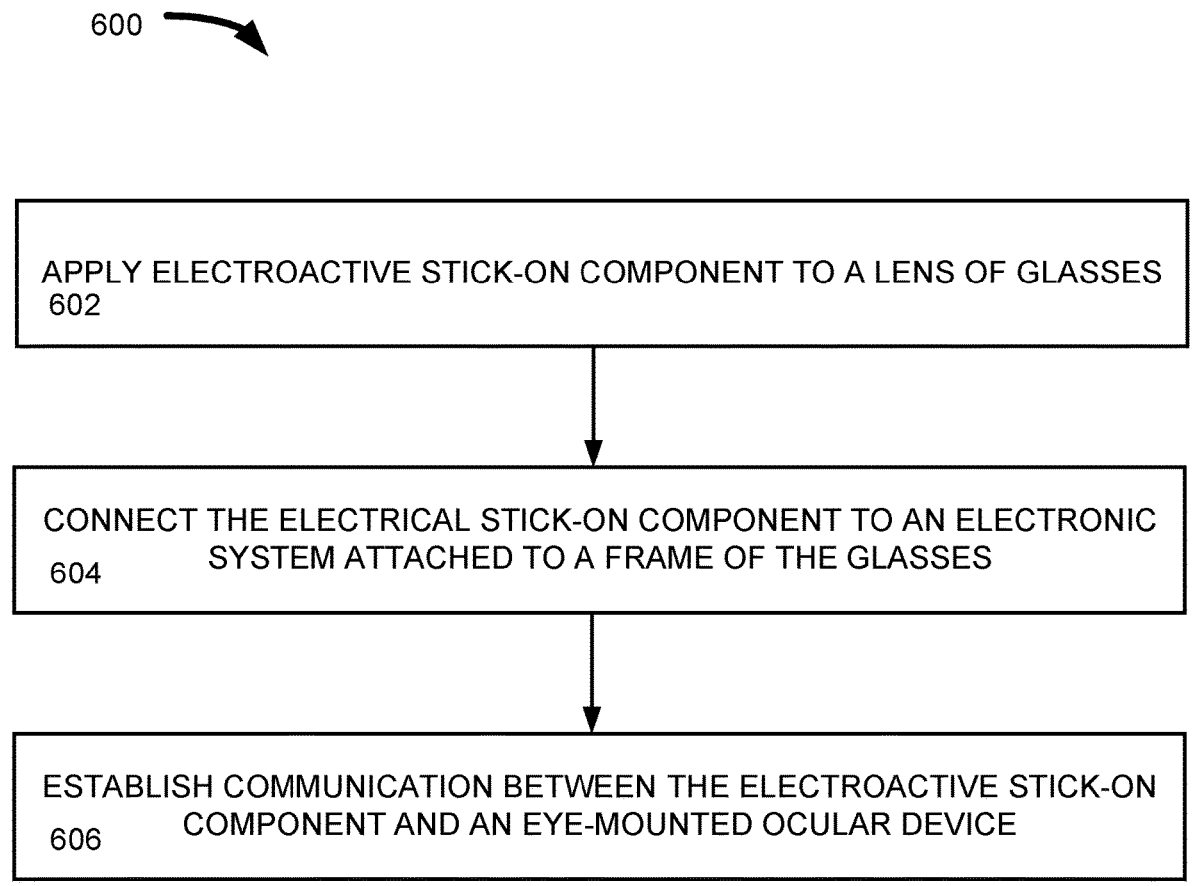
FIG. 6 illustrates a method of employing existing commercial frames and lenses to interface with an electronic eye-mounted ocular devices.

The electronic system (wire 104a and communication portion 104b) can communicate with two external devices, shown in FIGS. 4 and 5 (components of each can be used in connection with FIG. 3, and may be used together). As shown in FIG. 4, the electronic system (wire 104a and communication portion 104b) can communicate (in a wired and/or a wireless manner) with a charging system 402. The charging system 402 (e.g., a battery charging system) can be a subcomponent within another device, such as an eyeglass case configured to house the eyeglasses, or can be a small charging station configured to house a portion of the electronic system (wire 104a and communication portion 104b), to recharge at least a portion of the power source. The charging system 402 can include an embedded long-life battery that can provide several charges to the power source of the electronic system (wire 104a and communication portion 104b) and/or can include connection, such as a plug, for an AC or DC power source. The charging system 402 can be a case that can be connected to an outlet for charging via a wired connection (such as USB-C) that can require several hours to fully charge so it can provide several charges to the power source of electronics system. As shown in FIG. 5, the electronic system (wire 104a and communication portion 104b) can communicate (in a wired and/or a wireless manner) with an external controller 502. As an example, the external controller 502 can be embodied in a smartphone or computer application. The external controller 502 can be utilized to further control the electroactive stick-on component (wire 104a and communication portion 104b), the electronic system, and/or the electronic eye-mounted ocular device. The external controller 502 can be controlled by the patient and/or a medical professional.

IV. Methods

Another aspect of the present disclosure can include a method 600 for interfacing (i.e., creating an interface) between the control system and one or more electronic eye-mounted ocular device by the modular system 100 that is attachable to a patient's preexisting eyeglasses. Interfacing between the control system and one or more electronic eye-mounted ocular device in this manner allows the control system to control the electronic eye-mounted ocular device, actuate the electronic eye-mounted ocular device, exchange data with the electronic eye-mounted ocular device, and/or charge the electronic eye-mounted ocular device. Additionally, the control system can control the electroactive stick-on component in response to one or more functions of the electronic eye-mounted ocular device. It should be understood that the modular system can include modules that include at least an electroactive stick-on component 102 that can be reversibly attachable to at least a portion of an eyeglass lens and an electronic system (shown in FIG. 1 as wire 104a and components portion 104b) reversibly attachable to at least a portion of an eyeglass frame and able to be in electrical communication with the electroactive stick-on component 102.

At 602, an electroactive stick-on component (e.g., electroactive stick-on component 102 of FIG. 1) can be applied to a lens of existing eyeglasses and an electronic system (e.g., wire 104a and components portion 104b) can be attached to a portion of the frame of the existing eyeglasses. It should be noted that the electroactive stick-on component can adhere to either lens of the eyeglasses on either side, either the front side facing the world or the back side facing the user. In some instances, one or more electroactive stick-on components can be attached to the same lens or to different lenses of the existing eyeglasses. The electroactive stick-on component can be of various sizes and/or shapes depending on the application and/or the shape of the underlying lenses. The electroactive stick-on component can be attached to and removed from the eyeglasses one or more times. Generally, the electroactive stick-on component may not substantially block or impede a user's vision. As an example, 90% or more of the visual field can be unobstructed. As another example, 93% or more of the visual field can be unobstructed. As a further example, 95% or more of the visual field can be unobstructed. As another example, the electroactive stick-on component can be adhered to the lens in an area outside the field of view.

As an example, the electroactive stick-on component can be attached to a lens like a sticker with an adhesive material or statically adhered to the lens. Optionally, the electroactive stick-on component may be additionally, or alternatively, mechanically clipped onto the frame or rime around the lens and/or the lens itself (e.g., with a spring-loaded clip or magnet assembly). In some instances, the adhesive material can be substantially see-through and may leave minimal residue on the glasses upon removal of the electroactive stick-on component, including one or more optical-grade pressure sensitive adhesives. In other instances, when adhesive material and/or residue is left on a lens after removal of an electroactive stick-on component, then the adhesive material and/or residue may be removable (e.g., by cleaning with a special chemical and/or warm water and soap).

At 604, the electrical stick-on component can be connected to the electrical system (e.g., wire 104a and components portion 104b) that has been attached to the frame of the eyeglasses (as described above, the electrical system provides the "brains" of the electrical stick-on component) The electronic system can include a components portion, which can be positioned on and attached to at least a portion of the frame (e.g., on one or more of a temple tip, an arm, a rim, or the nose bridge) and a wire, which can be positioned on and/or attached to at least a portion of the frame and can connect the components portion to the electroactive stick-on component to facilitate communication between the components portion and the electroactive stick-on component. The components portion and/or the wire of the electronic system can be attached to the frame by at least one of a removable adhesive, a mechanical attachment mechanism, a magnetic attachment mechanism, or the like. In some instance, the components portion of the electronic system may be configured to fit around or wrap around at least one portion of the frame of the eyeglasses. As an example, the electronic system can be embodied (at least in part) within a temple-tip attachment that can include one or more of a flexible substrate, an adhesive, extra power storage, additional control electronics, and additional interfaces with the electroactive stick-on component. The component portion of the electronic system can include control electronics (e.g., a non-transitory memory and a processor, a microprocessor, or the like) and a power source (e.g., a rechargeable battery). The component portion of the electronic system may also include a housing to protect the subcomponents of the component portion. In another example, the electronic system can be at least in part attached to the rim of the frames surrounding at least a portion of one of the lenses. The electronic system can communicate with the electroactive stick-on component (e.g., via the wire and/or by a wireless connection such as radio frequency (RF) or Bluetooth low energy (BLE)) to provide all or at least a part of the electrical functionality to the electroactive stick-on component (which can act as an end-effector). It should be noted that the electronic system need not be see through and may include conductive materials standard for a flexible printed circuit board PCB (such as polyimide, Polyethylene terephthalate (PET), nylon, Liquid Crystal Polymer (LCP), or the like).

The wire (e.g., made of a substantially flat, flexible mini-cable, attachable to the frame by one or more wire harness attachments) of the electronics system can interface with the electroactive stick-on component through respective electrical connection areas, such as attachment area 106 of FIG. 1 (e.g., using the connection mechanism of FIG. 2). In some instances, the interface between the wire and the electroactive stick-on component can be along an interface between the lens and the frame. Each of the wire and the electroactive stick-on component can be equipped with a connection mechanism, such as low-profile connector 200 shown in FIG. 2. The connection mechanisms can create a connection with one another so that the electroactive stick-on component and the electronic system can communicate therebetween.

At 606, communication can be established between the electroactive stick-on component and an eye-mounted ocular device. Communication can, additionally and/or alternatively, be established between the component portion of the electronic system and the eye-mounted ocular device. The communication can allow the electronic system and/or the electroactive stick-on component to perform control, actuation, data exchange, and/or charging tasks for the eye-mounted ocular device. In other words, the components portion of the electronic system and/or the electroactive stick-on component can wirelessly couple to an electronic eye-mounted ocular device to control and/or actuate the electronic eye-mounted ocular device, exchange data with the eye-mounted device, and/or charge the electronic eye-mounted ocular device.

For example, the components portion can store and communicate data related to a dosing scheme (e.g., timing to deliver doses, dose amounts, etc.) of the electronic eye-mounted ocular device. In another example, the components portion can be used to communicate a manual (e.g., by user input) or automatic (e.g., based on a signal from one or more sensors (e.g., EEG sensor, photodetector, IMU, etc.) in the electronic system, the electroactive stick-on component, and/or another associated physiological sensor) actuation signal to a portion of the electronic eye-mounted ocular device. In a further example, the electroactive stick-on component and/or the electronic system can wirelessly charge the electronic eye-mounted device (e.g., via RF/BLE chips, or the like). The communication and/or data can also run from the electronic eye-mounted ocular device to the electronic system and/or the electroactive stick-on component removably attached to the eyeglasses. For example, a sensor of the electronic eye-mounted ocular device, such as a glucose sensor, a photodiode, a pressure sensor, or the like that can measure a physiological state of the user, can provide a signal to the electronic system and/or the electroactive stick-on component. In response to such a signal, the electronic system and/or the electroactive stick-on component can actuate a change (e.g., change a tint of the electroactive stick-on component, change a focusing or prescription of the electroactive stick-on component, or the like).

From the above description, those skilled in the art will perceive improvements, changes, and modifications. Such improvements, changes and modifications are within the skill of one in the art and are intended to be covered by the appended claims.

The following is claimed:

1. A modular system comprising:
    an electroactive stick-on component attachable to a portion of an eyeglass lens; and
    an electronic system attachable to an eyeglass frame in electrical communication with the electroactive stick-on component,
    wherein the electroactive stick-on component is configured to wirelessly couple to an electronic eye-mounted ocular device to control the electronic eye-mounted ocular device.

2. The modular system of claim 1, wherein the electroactive stick-on component comprises an electrical connection area configured to interface with an electrical connection area of the electronic system.

3. The modular system of claim 2, wherein the electroactive stick-on component and the electronic system are each configured to interface in the electrical connection area with a pair of low-profile conductors, each of the pair of low-profile conductors comprises at least one electrical interconnect and at least one magnet.

4. The modular system of claim 1, wherein the electroactive stick-on component is reversibly attachable to the eyeglass lens.

5. The modular system of claim 1, wherein the electronic system comprises additional control electronics for the electroactive stick-on component.

6. The modular system of claim 5, wherein the additional control electronics comprise an ASIC/IC, an RF/BLE chip, and/or a power source.

7. The modular system of claim 1, wherein the electroactive stick-on component comprises a loop antenna, Bluetooth low energy (BLE) device, or at least one LED for bidirectional communication with the electronic eye-mounted ocular device.

8. The modular system of claim 1, wherein the electronic system comprises a flat, flexible cable to connect to the electroactive stick-on component.

9. The modular system of claim 1, wherein the electronic system is configured to communicate with an external controller.

10. The modular system of claim 9, wherein the external controller is embodied in a smartphone application.

11. The modular system of claim 9, wherein the electronic system is configured to communicate with the external controller according to a wireless connection.

12. The modular system of claim 1, wherein the electronic system is configured to be recharged by a battery charging system.

13. The modular system of claim 12, wherein the battery charging system is configured to be on and/or within an eyeglasses case configured to house the eyeglass frame.

14. The modular system of claim 1, wherein the electroactive stick-on component is at least partially transparent.

15. A modular system comprising:
    an electroactive stick-on component attachable to a portion of an eyeglass lens; and an electronic system attachable to an eyeglass frame in electrical communication with the electroactive stick-on component, wherein the electroactive stick-on component is configured to wirelessly couple to an electronic eye-mounted ocular device to control the electronic eye-mounted ocular device, actuate the electronic eye-mounted ocular device, exchange data with the electronic eye-mounted ocular device, and/or charge the electronic eye-mounted ocular device, and wherein the electroactive stick-on component comprises at least one illumination device, at least one camera, and/or at least one sensor.

16. A method comprising:

applying an electroactive stick-on component to at least one lens of eyeglasses, wherein the electroactive stick-on component is reversibly attachable to the at least one lens of the eyeglasses;

connecting an electrical connection area of the electroactive stick-on component comprising a low profile conductor to an electrical connection area comprising another low profile conductor of an electrical system attached to a frame of the eyeglasses; and establishing communication between the electrical stick-on component and an electronic eye-mounted ocular device so that the electrical system is configured to control the electronic eye-mounted ocular device.

17. The method of claim 16, wherein the electroactive stick-on component is at least partially transparent.

18. The method of claim 16, wherein the electrical system is configured to communicate with an external controller embedded in a smartphone application.

19. The method of claim 16, wherein the electroactive stick-on component is reversibly attachable to the at least one lens of the eyeglasses.

20. The method of claim 16, wherein the electroactive stick-on component comprises an electrical connection area configured to interface with an electrical connection area of the electrical system.

* * * * *